Aug. 8, 1950           A. F. McMAHON           2,518,242

REFRIGERATOR HAVING AN AIR PUMP CIRCUIT

Filed April 5, 1944                                   3 Sheets-Sheet 1

INVENTOR.
Alexander F McMahon
BY HIS ATTORNY
Watson D. Harbaugh

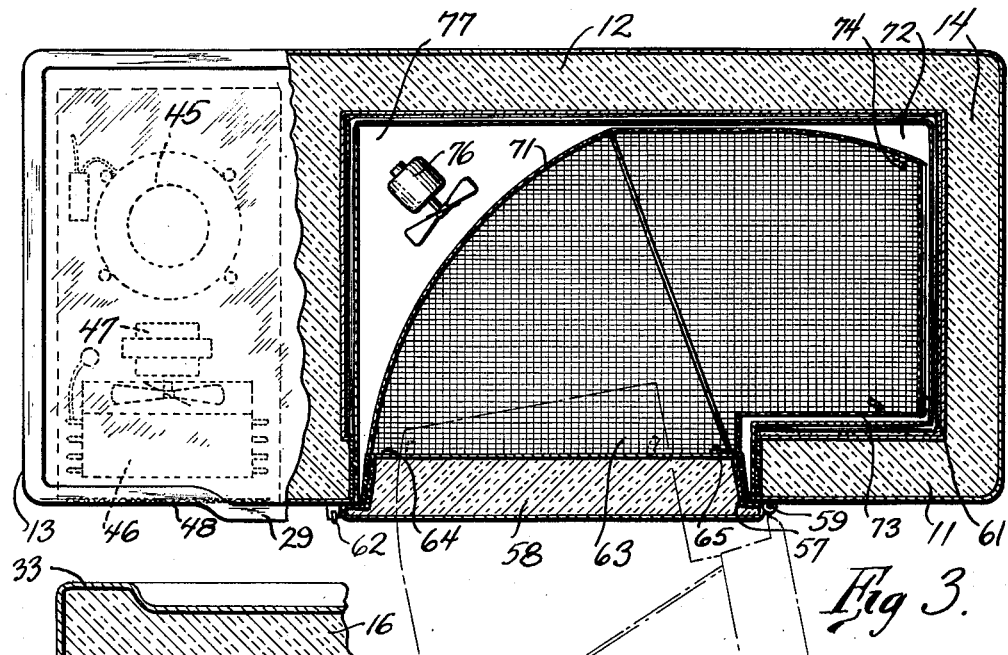
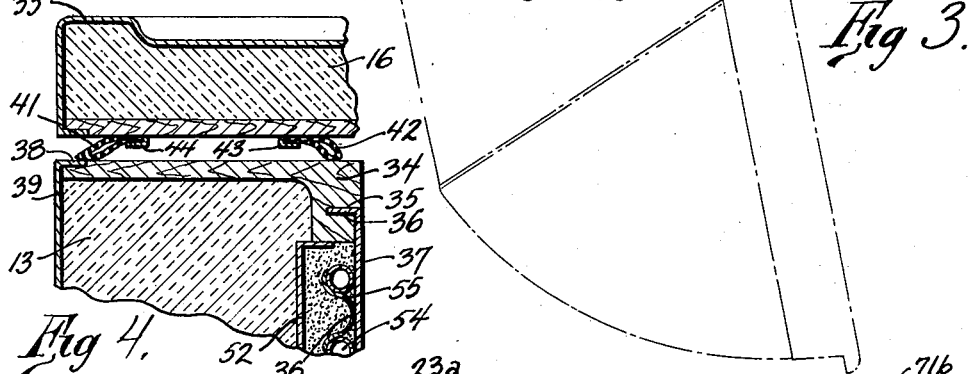
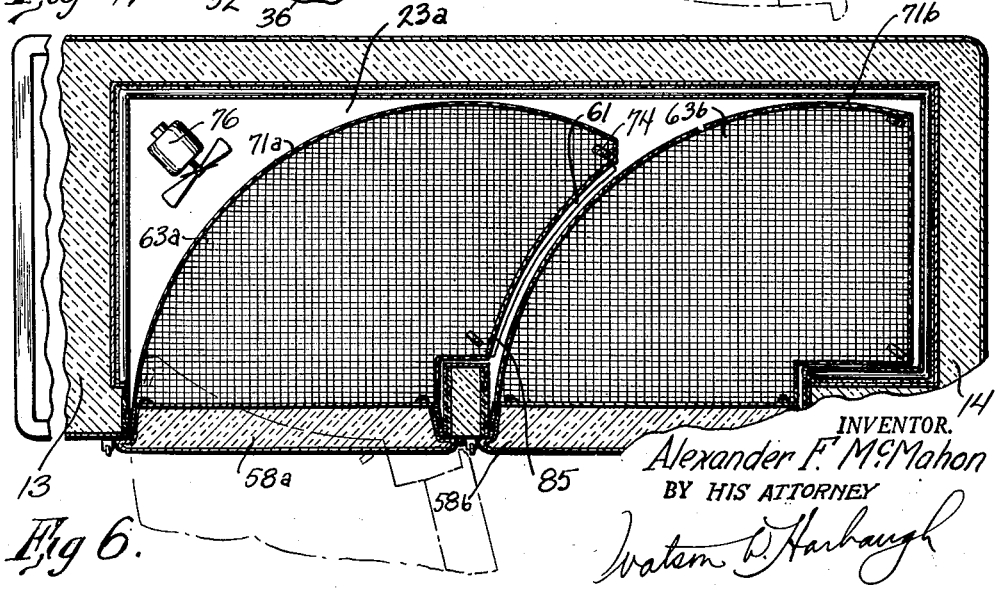

Aug. 8, 1950 A. F. McMAHON 2,518,242
REFRIGERATOR HAVING AN AIR PUMP CIRCUIT
Filed April 5, 1944 3 Sheets-Sheet 3
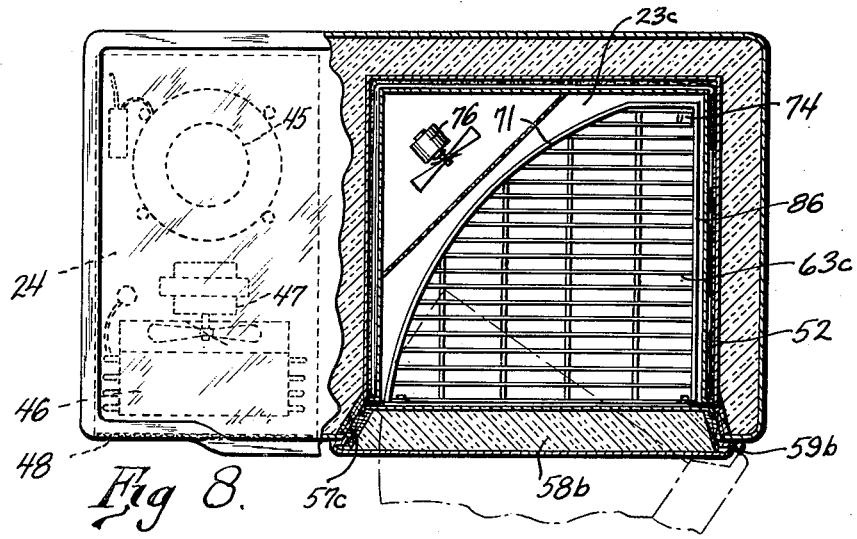
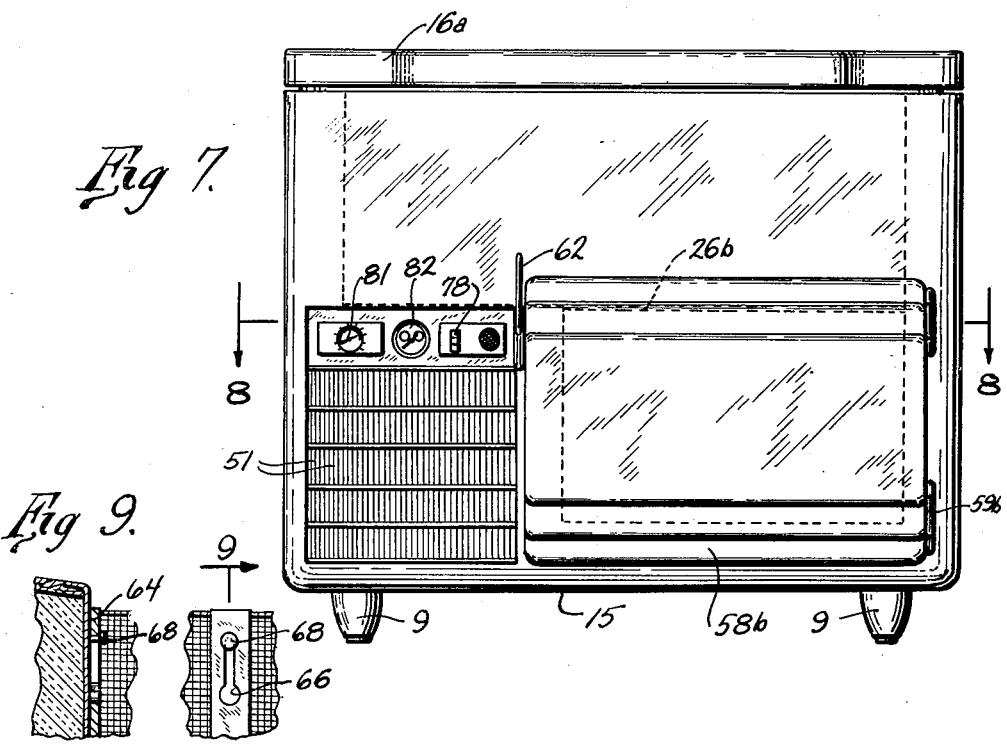
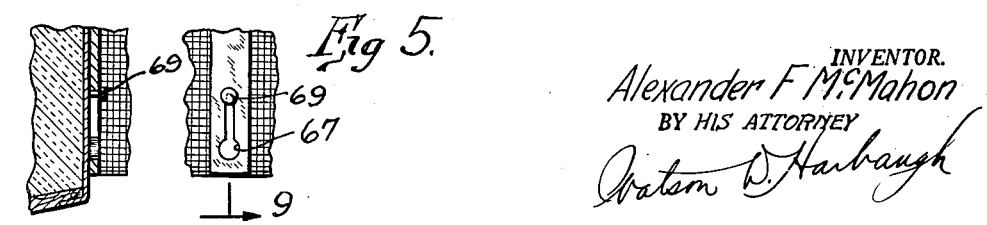
INVENTOR.
Alexander F. McMahon
BY HIS ATTORNEY Patented Aug. 8, 1950

2,518,242

UNITED STATES PATENT OFFICE 2,518,242

REFRIGERATOR HAVING AN AIR PUMP CIRCUIT

Alexander F. McMahon, Oak Park, Ill., assignor to The Bastian-Blessing Company, Chicago, Ill., a corporation of Illinois Application April 5, 1944, Serial No. 529,626

9 Claims. (Cl. 62—102)

This invention relates to food processing apparatus, and more particularly to a construction for quickly freezing food products and for maintaining the same at low temperatures.

One of the objects of the invention is the provision of a food processing apparatus that is so constructed that the cabinet which contains the refrigerating mechanism and food products may be employed to replace the conventional kitchen table, and the apparatus is so arranged that it functions as a quick freezing cabinet as well as a modern refrigerating or cooling apparatus for maintaining foods at comparatively low temperatures.

Another object of the invention is the provision of a new and improved apparatus for processing foods by rapidly lowering the temperature thereof to several degrees below freezing after the same has been placed in the cabinet.

The invention is further characterized by an improvement means for preventing the exhaust of power circulated cold air from the freezing compartment when the door is open.

A further object of the invention is the provision of a food processing and preserving cabinet that has the structure so arranged that the food products are easily packed in place and readily removable from the cabinet.

A still further object of the invention is the provision of a new and improved refrigerating apparatus that is simple in construction, easily assembled, is sanitary, that may be easily cleaned, and has a cabinet that may be utilized as an article of furniture for the household.

Other and further objects and advantages of the invention will appear from the following description, taken in connection with the accompanying drawings in which:

Fig. 3 is a section on the line 3—3 of Fig. 2;

Fig. 4 is a section on the line 4—4 of Fig. 1;

Fig. 5 is a detailed view of the means for attaching the receptacle to the door with parts broken away;

Fig. 6 is a section similar to Fig. 3, but showing a modified form of construction, with parts broken away;

Fig. 7 is a front elevation of a modified form of construction;

Fig. 8 is a top plan view of a modified form of construction, with parts broken away; and Fig. 9 is a section on the line 9—9 of Fig. 5.

Figure 1:
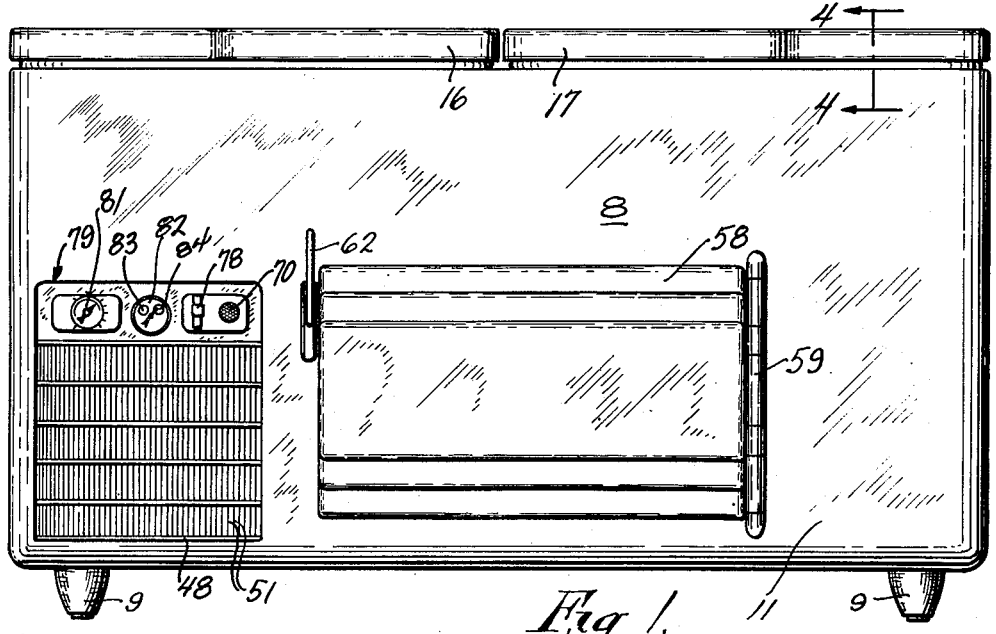
Fig. 1 is a front elevation of one form of construction.

It is well known that certain food products, such as fresh vegetables, meats, and the like, and even cooked foods, are preserved in fresh condition if they be quickly frozen while they are fresh or freshly cooked, and retained in frozen condition until immediately before the same are served or cooked. Within the past few years large refrigerating cold storage structures, providing locker space therein for quickly freezing and preserving food products, have been erected and the public has rented these lockers for preserving fresh meats and vegetables at low temperatures over a period of time. These lockers, however, require frequent travel to use them.

The present invention has for one of its objects this same principle applied to family size cabinets without need for frequent travel. With the aid of a convenient or family size cabinet containing the proper refrigerating mechanism, small amounts of fresh meats and vegetables may be quickly frozen and the same preserved in fresh condition for days and weeks.

The two systems may be employed together to great advantage to the family desiring such foods. For instance, a family may live at a distance from the cold storage plant and may have a large amount of various foods in one or more of its lockers. Once a week, or at various intervals of time, these lockers may be visited and enough of these frozen foods and meats to supply the family for several days may be removed to the domestic refrigerating cabinet and there retained in frozen condition until needed, thus eliminating the necessity of visiting the locker at frequent intervals. Not only this, but small quantities of food can be cooked and frozen in the domestic cabinet without need for time or delay required in traveling to the community locker.

Referring now to the drawings, the reference character 8 designates a refrigerating cabinet supported by suitable legs 9. This cabinet has a front wall 11, a back wall 12, end walls 13, 14, and a bottom wall 15. A pair of lids or closures 16, 17, are each hinged to the back walls by suitable hinges, as 18, 19 (Fig. 2), and their adjacent edges are adapted to be supported by a bar 21 extending across and connecting the upper edges of the front and back walls.

The cabinet comprises an upper cooling or refrigerating compartment 22 (Fig. 2), a lower or quick freezing compartment 23 under one end portion of the compartment 22 and a condensing unit chamber 24 under the other end portion of the refrigerating compartment 22. The front, back, end and bottom walls of the cabinet enclosing the upper and lower compartments each comprise inner and outer sheets of material spaced apart, and the space between the two sheets filled with suitable insulating material 25, as is usual in such constructions. The outer sheet is preferably, though not necessarily, enameled in the usual manner.

The chamber 24 for the condensing unit 20 does not have insulated walls on its outer sides, ends or bottom. The refrigerating compartment 22 is separated from the quick freeze compartment 23 by a removable lid or partition 26, Fig. 2, which is supported by suitable brackets 27 on the inner walls of the quick freeze compartment. This lid or partition may be provided with finger openings 28, for convenience in removing the same. The compartments 22 and 23 may be combined in one by removing the partition 26.

A suitable divider or movable partition 30, having a base 31 for holding it in upright position, is provided for the refrigerating compartment 22 for dividing the same into two separate chambers. This divider is movable along the bottom wall of the refrigerating chamber for varying the sizes of the two chambers.

The lids or closures 16, 17, are also formed from suitable sheet material having insulation between the sheets, as is usual in such constructions. The upper sheet of each of the closures is provided with an upstanding bead or projection 33, which extends around the four edges of the same so that the articles placed on the closure, when in lowered position, will be prevented from rolling off the cabinet. The height of the cabinet is such that it may be conveniently substituted for the conventional kitchen table and the tops have overhanging portions 29 by which they can be grasped and manually raised (Fig. 3). By limiting the height of the cabinet to about that of the kitchen table, the refrigerating compartment 22 is not over 12" or 14" in depth; hence all articles therein are readily accessible without necessitating the removal of a large number of articles in order to find the ones desired.

Furthermore, by providing vertically moving doors or closures for the refrigerating compartment, access may readily be had to all the articles of this compartment by simply raising the lids without the cold air within the compartment flowing out onto the kitchen floor, as it does when horizontally movable refrigerator doors are opened. These are the doors that are most frequently opened, and hence there is a minimum loss of cold air in the use of such an apparatus.

The upper edges of the upstanding walls are provided with a breaker strip 34, Fig. 4, for separating the facing metal 39 from the lining metal 37, for preventing transference of heat from the exterior to the interior of the cabinet. This strip is of non-conducting material, such as synthetic resin, or the like. The breaker strip 34 extends along the top edge of these walls and is provided on its inner edge below the top thereof with a rabbet or groove 35, adapted to receive the inturned flange 36 of the metal lining sheets 37. The outer upper edge of the breaker strips 34 are each provided with a rabbet for receiving the flange 38 of the outer sheet 39 of the insulated wall of the cabinet. Each of the closures is provided with suitable sealing loops 41, 42, for sealing the space between the closure and the upper edges of the upstanding walls of the cabinet.

In the form of the device selected to illustrate this feature of the invention, two loops of elastic material, as rubber or other suitable resilient material, are employed for this purpose. The loops of rubber have their edges clamped by suitable brackets 43, 44, against the under side of the closure, and these brackets are spaced apart and turned in opposite directions so that the loop 41 will extend outwardly, while the loop 42 will extend inwardly, thus providing a space for still air between these loops when the closure is in its lowered position. As shown in Fig. 4, the lid is being lowered and the loops are about to come in contact with the upper edges of the upstanding walls of the cabinet. When the lid is lowered to its closed position these loops will be compressed, thus forming an air-tight joint.

The chamber 24 is adapted to receive the condensing unit 20, which comprises a compressor 45, Fig. 3, a condenser 46, and a fan 47 for causing a current of air to flow across the condenser. The details of the compressor and fan constitute no part of the present invention and it is not thought necessary to further illustrate or describe the same, but with reference to the arrangement of the parts and the structure of the condenser it is to be noted that the condenser 46 is located next to the front wall of the chamber 24 and a grill 48 which constitutes the front wall of the chamber is adapted to be removed when it is desired to sweep or clean off the dust from the front of the condenser. The condenser acts as a visual shield aesthetically and has attached thereto radiating fins 51, which extend vertically, thereby facilitating the cooling action of the front of the compressor compartment and the dusting or cleaning operation. The opposite end of the chamber 24 may also be provided with a grill so that air is free to flow through the chamber from end to end thereof transversely of the cabinet.

Figure 2:
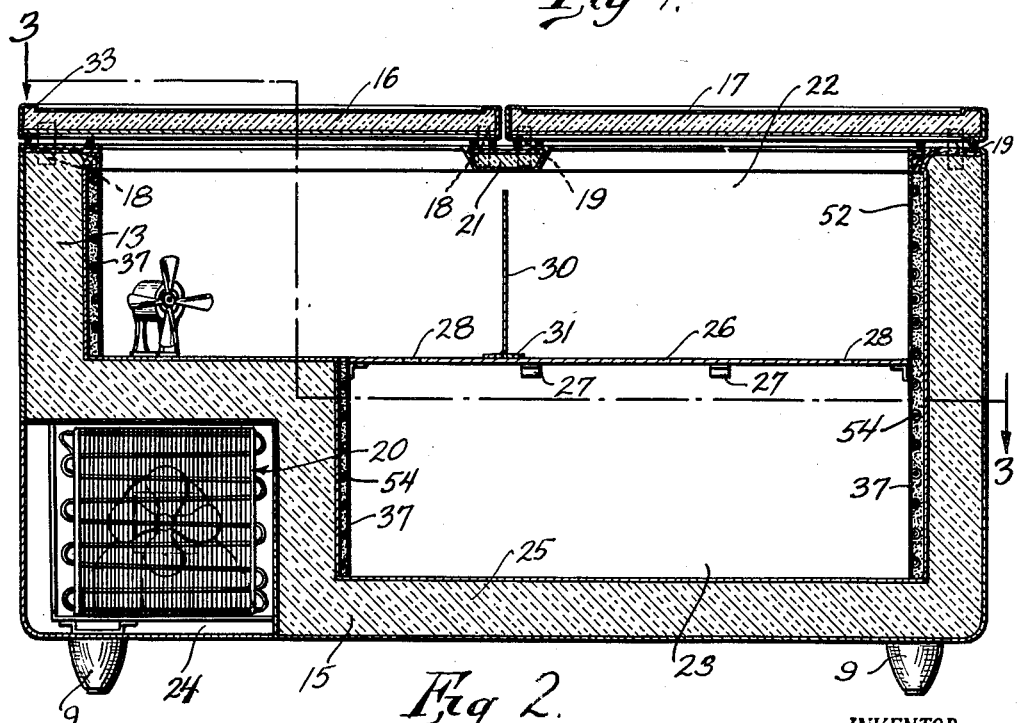
Fig. 2 is a longitudinal vertical section thereof.

The upstanding walls of the two compartments 22 and 23 are each provided with recesses 52 formed by offsetting outwardly the inner sheets of the wall, and within these recesses expansion coils 54, Fig. 2, are positioned. These coils are attached to inner sheets of heat-conducting material 37, forming the inner walls of the compartments. They are secured in heat exchange relation with these sheets or plates in any suitable manner. In the construction shown, metallic strips 55 are provided at suitable intervals around the two compartments, and these strips extend over the coils and are welded therebetween to the sheets 37, between the coils, Fig. 4, for holding the coils firmly against said sheets. Suitable material, such as a thermoplastic, or preferably a material that is liquid at moderately high temperature but which hardens on cooling, is poured in the space around the coils 54 for holding the latter in fixed position. The material known to the trade as "hydrolene" is excellent for this purpose.

By means of this arrangement the metal sheets 37 readily absorb heat from the compartments and transfer the same to the refrigerant within the expansion coils 54, thus lowering the temperature within the compartments.

The lower or "quick freeze" compartment 23 is maintained at a lower temperature than the upper compartment, and the difference in temperature of the two may be varied by varying the number of expansion coils for each compartment, or by valving the refrigerant to each independently or by otherwise varying the construction. With the same number of turns for each compartment the temperature may be varied by varying the relative sizes of the two compartments. The temperatures of the lower compartment may range from 10 or 15 degrees Fahrenheit, or more, above zero to minus 20 degrees Fahrenheit, depending on the construction and arrangement of the parts.

In the form of construction shown, the difference in temperature between the upper and lower compartments is somewhere about 6 or 8 degrees. The lower compartment is usually maintained at low temperature, so that food products placed therein will freeze fairly promptly. Both compartments may be, and preferably are, maintained at temperatures below freezing.

Access may be had to the upper compartment by raising one or both of the closures 16, 17, and access may also be had to the lower compartment from the top of the cabinet by removing the partition 26. Suitable means are, however, provided for obtaining access to the lower compartment from the front of the cabinet, and for this reason a door opening 57 is provided in the front of the cabinet which extends from approximately the lower surface of the partition 26 to the bottom of the compartment, and from the inner end of the compartment 23 to a point spaced from the outer end of this compartment. A door 58, Figs. 1 and 3, constructed in a manner similar to the insulated walls, is hinged at one of its vertical edges to the front wall of the lower compartment by fairly heavy hinges 59. Suitable latch mechanism 62, of the usual or any well known construction, is provided for holding the door in closed position. The latch is mounted preferably upon the cabinet instead of the door to provide knee room, and comes within the thickness of the door.

Since the lower compartment is adjacent the lower portion of the cabinet, and since this compartment is more or less inaccessible, suitable means are provided for containing the articles to be frozen so that they will be accessible when the door is opened. In the form of construction shown, which is by way of example only, a basket or cage is provided which is caused to move through the door opening when the door is opened. As shown, a receptacle or basket 63, of reticulated material, preferably of woven wire of fairly large mesh or of perforated material, is provided and is attached to the door so that it will move therewith. This basket is detachably connected to the door. It is provided with a pair of plates 64, 65, Figs. 3 and 5, which are attached to the basket opposite the free and hinged edges of the door. These plates are each provided with upper and lower key-hole slots 66, 67, with the narrow portions of the opening extending upwardly. The door 58 is provided with headed pin 68, 69, adapted to pass through the enlarged opening of the slot when the basket is to be attached.

In attaching the basket in position the door is first opened, the basket elevated until the pins 68, 69 pass through the enlarged openings of the key-hole slots 66, 67, after which the basket is lowered so that the pins will engage the upper portions of the slots and the heads on the pins will prevent their disengagement. In order that the basket 63 shall be movable into the compartment 23, the rear side 71 thereof is curved on a radius, the center of which is the axis of the hinges 59. In the form of construction shown in Fig. 3, a lateral extension 73 is provided for the basket which will occupy the space 72 extending laterally and rearwardly from the door. As shown, the extension 73 is integral with the basket 63, and its inner side is curved so that it will clear the back wall of the compartment when the door is opened or closed.

Suitable means are provided for assisting in supporting the inner ends of the basket while the door is open or is being opened or closed. As shown, rollers 74, which engage the floor of the compartment 23, are provided for this purpose on the lower side of the basket, as shown more clearly in Fig. 3 of the drawing.

In order to rapidly lower the temperature of food products that may be placed in the compartment 23, means are provided for circulating the air therein to circulate the air rapidly through the reticulated material into contact with the contents of the basket. As shown, a fan 76 is provided for this purpose. The fan is removably mounted in the triangular space 77 not occupied by the basket. A switch for the fan is shown at 78 on the panel board 79 on the front of the cabinet, as shown in Fig. 1. A suitable tell-tale light for the switch is shown at 70. When the switch is closed the indicator may be energized.

The door 58 is opened very seldom but for the occasions when it is, the side of the basket which remains inside or at the opening 57 when the door is open, is covered with a sheet metal member 61 forming a wall which lies in the path of the air driven by the fan 76 and redirects it back into the interior of the cabinet and thereby prevents the exhausting of the cold air from the cabinet while the fan is running and the door is open. Otherwise, the fan will be shut off during the times that the basket is being filled preparatory to freezing, or being emptied after freezing.

Means for controlling the temperature within the cabinet is shown at 81, and is of the usual or any well known construction, and need not be herein described.

A suitable alarm or warning signal 82 is also provided, and this signal is of the visible type having a green light 83 for indicating when the device is operating, and a red light 84 to indicate that the compartments are not being maintained at the required temperature.

The form of construction shown in Fig. 6 is substantially the same as that already described, except that the quick freeze compartment 23ᵃ is provided with two doors 58ᵃ and 58ᵇ. The baskets 63ᵃ and 63ᵇ are detachably connected to the respective doors in the manner already described. The rear sides 71ᵃ and 71ᵇ of these baskets are curved, as previously described, but the basket 63ᵃ has its side wall 85 concave to conform with the convex surface of the arcuate side 71ᵇ of the basket 63ᵇ, so that the baskets will occupy a maximum of space within the compartment 23ᵃ.

Figs. 7 and 8 differ from the construction shown in Figs. 1 and 2 in that the door opening 57ᶜ for the compartment 23ᶜ is coextensive with the front side of the compartment. In such an arrangement the basket 63ᶜ, which is detachably connected to the door in a manner already described, does not have an extension corresponding with the extension 73 of the receptacle or basket 63 of Fig. 3. In this form of construction the imperforate end side 86 of the basket is parallel with and closely adjacent to the end wall of the compartment when the door is closed so that in plan the basket is substantially in the form of a quadrant of a circle. A single lid or closure 16ᵃ is provided for the cabinet. This lid or closure is hinged at the rear edge and opens upwardly from the front, as in the previous constructions. Since the remaining portion of the structure is substantially the same as that already described, it is not thought necessary to again illustrate those details or to repeat the description.

While the cabinets disclosed have two permanent compartments, it is understood that the number may be varied as desired. When necessary or desirable, the basket may be removed from the door so as to provide an unobstructed "quick freezing" compartment. The fan may also be removed, if desired, to provide full or auxiliary space for storing frozen foods.

It is thought from the foregoing, taken in connection with the accompanying drawing, that the construction and operation of my device will be apparent to those skilled in the art, and that changes in size, shape, proportion and details of construction may be made without departing from the spirit and scope of the appended claims.

What is claimed is:

1. A refrigerating cabinet having a quick freezing chamber provided with a door opening, a door for said opening, a perforate food basket detachably attached to said door and movable with said door to a position within said chamber for occupying substantially all the space in the chamber when the door is closed except a rear corner space and movable with the door to a position affording access to the container when the door is opened, means within said corner for moving cold air under forced circulation through said basket to freeze the contents thereof and means for maintaining the temperature of said cooling chamber materially below the freezing point.

2. In a refrigerating cabinet, a quick freezing chamber having a corner defined by two upstanding walls, a door opening in a third upstanding wall, a closure for said opening hinged at a point spaced from said two upstanding walls to swing in a substantially horizontal plane, and a basket conforming to the inner side of the closure and detachably secured thereto, said basket having an imperforate wall at right angle to the plane of said door for closing said door opening when said door is open to the limit of its outward movement, said receptacle having an inner side curved on a radius of a length substantially equal to the width of said door and with the axis of the hinges as a center, means received in said corner for moving cold air into said basket and means for normally maintaining the interior of said cooling chamber below the freezing temperature.

3. In a refrigerating cabinet, a cooling chamber having a door opening in one of its upstanding walls, a closure for said opening hinged to swing in a substantially horizontal plane, and a wire basket conforming to the inner side of the closure and detachably secured thereto, said wire basket having an inner side curved on a radius of a length substantially equal to the width of said door and with the axis of the hinges as a center, said basket having one side extending at right angle to the plane of said door and parallel with the adjacent end wall of said cooling chamber when the closure is in closed position, roller means supporting the basket proximate to said inner side and a fan in the rear corner of said chamber opposite the free edge of said closure when in closed position and within said cooling chamber for directing a current of air on said basket.

4. In a refrigerating cabinet, a cooling chamber having a door opening in one of its upstanding walls, a closure for said opening hinged to swing in a substantially horizontal plane, a receptacle conforming to the inner side of the closure and detachably secured thereto, said receptacle having an inner side curved on a radius of a length substantially equal to the width of said door and with the axis of the hinges as a center, said receptacle being in the form of a quadrant of a circle, and casters connected to the inner portions of said receptacle and engaging the floor of said cooling chamber for assisting in supporting said receptacle and a fan in the rear corner of said cooling chamber opposite the curved portion of said receptacle, when said closure is in closed position.

5. A refrigerating cabinet having a sub-freezing cooling chamber, a hinged door for said chamber, a power driven fan in the rear corner of the chamber opposite the face edge of the door, a food container attached to said door and movable to a position in the path of air from said fan within said chamber for occupying substantially all of the space in the chamber except said rear corner when the door is closed and to a position affording access to the container when the door is opened, and means for detachably connecting said container to said door and means for maintaining the temperature of said chamber below freezing.

6. In a refrigerating cabinet, insulated top, bottom, end and side walls forming a chamber, a removable horizontal partition dividing said chamber into an upper cooling compartment and a lower freezing compartment, certain of said walls both above and below said partition having recesses formed therein, expansion coils in said recesses, for maintaining said compartments below freezing temperature, with the lower chamber at the lower temperature lining sheets of heat conducting material for closing said recesses, metal straps extending over said coils and welded between the turns of said coils to said sheets, and a solid material that is liquid at moderately high temperatures filling the space around the coils.

7. In a refrigerating cabinet, a freezing compartment substantially rectangular in horizontal section, and having door means in one wall thereof, receptacle means detachably mounted on said door means and occupying substantially all of the space of said compartment, except one corner thereof, said receptacle means having a curved wall convex toward said corner, and a fan in said corner for circulating the air within said compartment across said receptacle means for cooling the food in said receptacle means.

8. A refrigerating cabinet, having a lower quick freeze compartment, a door in one vertical wall for having access to said compartment, an upper refrigerating compartment directly above said lower compartment, and having an opening in its upper wall, a movable closure for said opening, a removable partition between said compartments where access may be had to the lower compartment either through said door or through said opening and upper compartment when said partition is removed, and means in heat transfer relation with the walls of both of said compartments for maintaining the temperature of each compartment below freezing with the temperature of the lower compartment below that of the upper compartment and sufficiently low to quick freeze foods placed therein.

9. In a cabinet having a quick freeze compartment, a door hinged to one vertical wall of said compartment, a food receiving basket of reticulated material carried by said door and movable therewith, means for detachably connecting said basket to said door, said basket having a curved inner retaining wall and an imperforate wall extending at right angle to said door for closing the door opening when the door is open, said basket occupying substantially all the space within said compartment except one rear corner thereof, a fan in said rear corner for blowing air across said basket when said door is closed, and refrigerating means for maintaining the temperature of said compartment below freezing.

ALEXANDER F. McMAHON.

REFERENCES CITED

The following references are of record in the file of this patent:

UNITED STATES PATENTS

| Number | Name | Date |
|---|---|---|
| 549,713 | Fischl | Nov. 12, 1895 |
| 655,275 | Roth | Aug. 7, 1900 |
| 836,106 | Feldkircher | Nov. 20, 1906 |
| 940,416 | Young | Nov. 16, 1909 |
| 1,098,787 | Doud | June 2, 1914 |
| 1,400,643 | Van Dyke | Dec. 20, 1921 |
| 1,541,769 | Platter | June 9, 1925 |
| 1,951,223 | Van Doren | Mar. 13, 1934 |
| 2,072,347 | Strebler | Mar. 2, 1937 |
| 2,074,438 | Swedman | Mar. 23, 1937 |
| 2,084,204 | Knight | June 15, 1937 |
| 2,107,076 | Mason | Feb. 1, 1938 |
| 2,125,444 | Holderle | Aug. 2, 1938 |
| 2,139,441 | Clarke | Dec. 6, 1938 |
| 2,163,031 | Gaalstone | June 20, 1939 |
| 2,215,372 | Howeth | Sept. 17, 1940 |
| 2,228,144 | Miller | Jan. 17, 1941 |
| 2,287,681 | Hazard | June 23, 1942 |
| 2,290,647 | Lowell | July 21, 1942 |
| 2,307,094 | Yoxsimer | Jan. 5, 1943 |
| 2,324,527 | Morrison | July 20, 1943 |
| 2,361,792 | Philipp | Oct. 31, 1944 |
| 2,381,667 | Jensen | Aug. 7, 1945 |
| 2,387,356 | Robison | Oct. 23, 1945 |